United States Patent
Tonami et al.

(10) Patent No.: US 8,547,596 B2
(45) Date of Patent: Oct. 1, 2013

(54) IMAGE FORMING APPARATUS, IMAGE FORMING METHOD, AND COMPUTER PROGRAM PRODUCT

(75) Inventors: Kazunari Tonami, Kanagawa (JP); Hiroyuki Kawamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 265 days.

(21) Appl. No.: 13/137,052

(22) Filed: Jul. 18, 2011

(65) Prior Publication Data
US 2012/0019844 A1   Jan. 26, 2012

(30) Foreign Application Priority Data

Jul. 23, 2010 (JP) .................................. 2010-166034
May 23, 2011 (JP) .................................. 2011-114693

(51) Int. Cl.
*G06F 15/00* (2006.01)
*G06K 1/00* (2006.01)
*H04N 1/60* (2006.01)

(52) U.S. Cl.
USPC ........................................... 358/1.9; 358/3.1

(58) Field of Classification Search
None
See application file for complete search history.

(56) References Cited

U.S. PATENT DOCUMENTS

| | | | |
|---|---|---|---|
| 5,768,412 A * | 6/1998 | Mitsuyama et al. | .......... 382/173 |
| 7,206,002 B2 | 4/2007 | Kawamoto | |
| 7,327,495 B2 | 2/2008 | Kawamoto et al. | |
| 2002/0196470 A1 | 12/2002 | Kawamoto et al. | |
| 2003/0122825 A1 | 7/2003 | Kawamoto | |
| 2004/0257625 A1 | 12/2004 | Tonami | |

FOREIGN PATENT DOCUMENTS

| | | |
|---|---|---|
| JP | 2006201613 A | 8/2006 |
| JP | 2007274438 A | 10/2007 |
| JP | 2008158504 A | 7/2008 |
| JP | 2008236638 A | 10/2008 |
| JP | 2009139432 A | 6/2009 |

OTHER PUBLICATIONS

Abstract of JP 2008-158504 published Jul. 10, 2008.
Abstract of JP 2007-274438 published Oct. 18, 2007.
Abstract of JP 2008-236638 published Oct. 2, 2008.
Abstract of JP 2009-139432 published Jun. 25, 2009.
Abstract of JP 2006-201613 published Aug. 3, 2006.

* cited by examiner

*Primary Examiner* — Douglas Tran
(74) *Attorney, Agent, or Firm* — Harness, Dickey & Pierce, P.L.C.

(57) ABSTRACT

An image forming apparatus includes a first density correction unit that corrects density correction characteristics in correcting density of print image data to be output by using a density correction patch formed in an image forming process; a second density correction unit that corrects the density correction characteristics by using a density correction patch printed on a recording sheet; an image inspection unit that compares an image density of inspection image data obtained by scanning a printed output image with an image density of the print image data to be output, thereby inspecting a magnitude of a density change in the printed output image; and a density control unit that selects one from the first and second density correction units according to the magnitude of the density change and causes the density correction characteristics to be corrected by the selected one from the first and second density correction units.

9 Claims, 10 Drawing Sheets

| C | M | Y | K |
|---|---|---|---|
| C1 | M1 | Y1 | K1 |
| C2 | M2 | Y2 | K2 |
| C3 | M3 | Y3 | K3 |
| C4 | M4 | Y4 | K4 |
| C5 | M5 | Y5 | K5 |
| C6 | M6 | Y6 | K6 |
| C7 | M7 | Y7 | K7 |
| C8 | M8 | Y8 | K8 |
| C9 | M9 | Y9 | K9 |
| C10 | M10 | Y10 | K10 |
| C11 | M11 | Y11 | K11 |
| C12 | M12 | Y12 | K12 |
| C13 | M13 | Y13 | K13 |
| C14 | M14 | Y14 | K14 |
| C15 | M15 | Y15 | K15 |
| C16 | M16 | Y16 | K16 |

| COLOR DIFFERENCE | FIRST DENSITY CORRECTION PROCESS (1) | SECOND DENSITY CORRECTION PROCESS (2) |
|---|---|---|
| LOW | — | — |
| MEDIUM | O | — |
| HIGH | — | O |

| COLOR DIFFERENCE (HIGH DENSITY) | COLOR DIFFERENCE (LOW TO MEDIUM DENSITY) | FIRST DENSITY CORRECTION PROCESS (1) | SECOND DENSITY CORRECTION PROCESS (2) | THIRD DENSITY CORRECTION PROCESS (3) |
|---|---|---|---|---|
| LOW | LOW | — | — | — |
|  | MEDIUM | O | — | — |
|  | HIGH | — | O | — |
| MEDIUM (CHANGE TO HIGHER DENSITY) | LOW | O | — | — |
|  | MEDIUM | O | — | — |
|  | HIGH | — | O | — |
| MEDIUM (CHANGE TO LOWER DENSITY) | LOW | — | — | O |
|  | MEDIUM | O | — | O |
|  | HIGH | — | O | O |
| HIGH | LOW | — | — | O |
|  | MEDIUM | O | — | O |
|  | HIGH | — | O | O |

IMAGE FORMING APPARATUS, IMAGE FORMING METHOD, AND COMPUTER PROGRAM PRODUCT

CROSS-REFERENCE TO RELATED APPLICATIONS

The present application claims priority to and incorporates by reference the entire contents of Japanese Patent Application No. 2010-166034 filed in Japan on Jul. 23, 2010 and Japanese Patent Application No. 2011-114693 filed in Japan on May 23, 2011.

BACKGROUND OF THE INVENTION

1. Field of the Invention

The present invention relates to an image forming apparatus that corrects density of an output image by checking a density change occurred in a printed matter, an image forming method, and a computer program product.

2. Description of the Related Art

A conventional print-on-demand printer typically includes, in addition to an image correction device, an image inspection apparatus that checks a density change occurred in an output image. When a density change has occurred, the printer performs a correction process to suppress the change, thereby ensuring accurate color and density, each of which is an element that determines quality of a printed matter. Techniques for the density correction process are broadly divided into a first technique and a second technique, as described below.

In the first technique, a density correction process is performed by forming a density correction patch on a photosensitive drum or an intermediate transfer belt at a portion outside an area where a print image is formed and detecting a density of the density correction patch (See Japanese Patent Application Laid-open No. 2008-158504, for example). In the second technique, a density correction process is performed by forming a density correction patch on a recording sheet and detecting a density of the density correction patch (See Japanese Patent Application Laid-open No. 2007-274438, for example). Automatic tone correction (ACC), which is generally employed by a multifunction peripheral (MFP), in which density is detected by using a scanner, can alternatively be employed.

In the conventional first technique described above, density of a patch on an output sheet is not actually measured, and accordingly, the first technique is less accurate in correcting density than the second technique. However, the first technique is advantageous in that image density correction is performed without interrupting output of a user image (or, even when the output is interrupted, an interrupted period of time can be very short) because the density correction patch is formed outside an image forming area of a print image.

In contrast, in the second technique, density of a patch on a printed sheet is measured by actual measurement; accordingly, the second technique has a benefit of keeping accuracy in density correction. However, when the second technique is adopted, productivity is decreased because the second technique requires the density correction patch to be output on the recording sheet. Under these circumstances, an optimal control method has been required for the density correction processes.

SUMMARY OF THE INVENTION

It is an object of the present invention to at least partially solve the problems in the conventional technology.

According to an aspect of the present invention, there is provided an image forming apparatus that includes a first density correction unit, a second density correction unit, an image inspection unit, and a density control unit. The first density correction unit corrects density correction characteristics in correcting density of print image data to be output by using a density correction patch formed in an image forming process. The second density correction unit corrects the density correction characteristics by using a density correction patch printed on a recording sheet. The image inspection unit compares an image density of inspection image data obtained by scanning a printed output image with an image density of the print image data to be output, thereby inspecting a magnitude of a density change in the printed output image. And the density control unit selects any one of the first density correction unit and the second density correction unit according to the magnitude of the density change inspected by the image inspection unit and causes the density correction characteristics to be corrected by the selected one of the first density correction unit and the second density correction unit.

According to another aspect of the present invention, there is provided an image forming apparatus that includes a first density correction unit, a second density correction unit, a third density correction unit, an image inspection unit, and a density control unit. The first density correction unit corrects density correction characteristics in correcting density of print image data to be output by using a density correction patch formed in an image forming process. The second density correction unit corrects the density correction characteristics by using a density correction patch printed on a recording sheet. The third density correction unit adjusts a condition of an image forming process by using a density correction patch formed in an image forming process. The image inspection unit compares an image density of inspection image data obtained by scanning a printed output image with an image density of the print image data to be output, thereby inspecting magnitudes of density changes occurred in two tonal regions which are a high-density region and a low-to-medium-density region, and which direction a density change has taken between to a lower density and to a higher density in the high-density region. And the density control unit controls the first density correction unit, the second density correction unit, and the third density correction unit according to results of the inspection on the magnitudes of density changes and direction of the density change inspected by the image inspection unit.

According to still another aspect of the present invention, there is provided an image forming method that includes correcting, as first density correction, density correction characteristics in correcting density of print image data to be output by using a density correction patch formed in an image forming process; correcting, as second density correction, the density correction characteristics by using a density correction patch printed on a recording sheet; performing image inspection by inspecting a magnitude of a density change occurred in a printed output image by comparing an image density of inspection image data obtained by scanning the printed output image with an image density of the print image data to be output; and causing the density correction characteristics to be corrected by a selected one of the first density correction and the second density correction, the selected one being determined according to the magnitude of the density change inspected at the image inspection.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
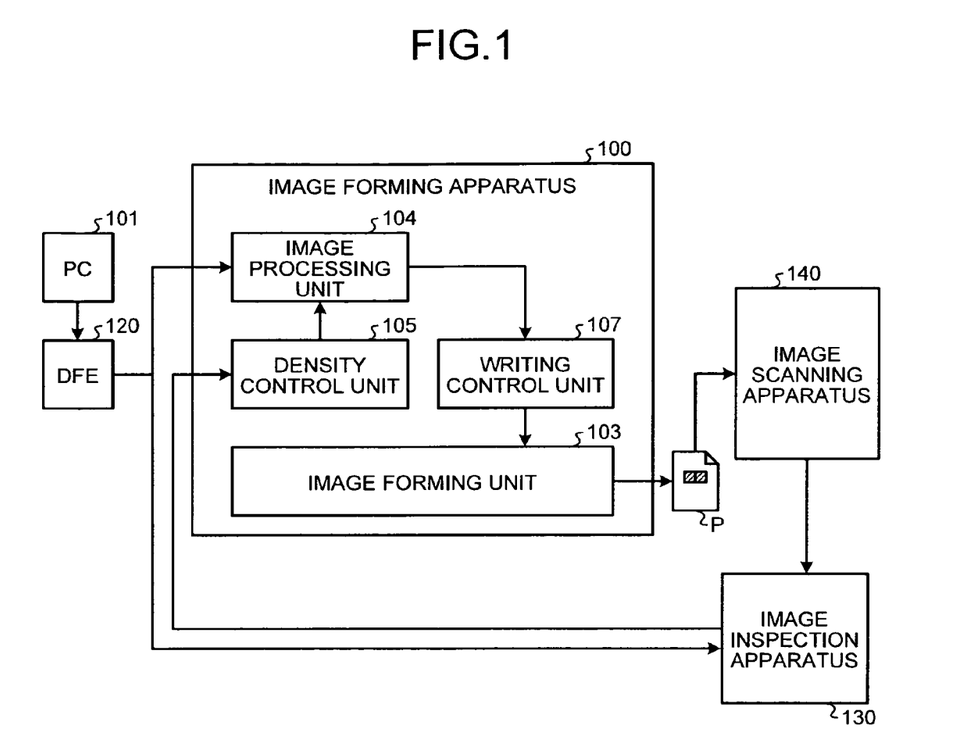
FIG. 1 is a block diagram illustrating a system configuration according to a first embodiment of the present invention.

Image forming apparatuses, image forming methods, and computer program products according to exemplary embodiments of the present invention are described in detail below with reference to the accompanying drawings.
First Embodiment FIG. 1 is a block diagram illustrating a system configuration according to a first embodiment of the present invention. The system includes a client personal computer (PC) 101, a print server 120, which is also called a digital front end (DFE), an image forming apparatus 100, an image inspection apparatus 130, and an image scanning apparatus 140.

When a user designates, through the client PC 101, to perform printing, the print server (DFE) 120 parses a printer language and performs image rendering to generate a bitmap image with output bits amounting to a file size that is receivable by the image forming apparatus 100. In the first embodiment, the client PC 101 generates an image, in raster image processor (RIP) format, of 8 bits per color (cyan (C), magenta (M), yellow (Y), and black (Bk)) and 600 dots per inch (dpi). This image data is transmitted to the image forming apparatus 100, which in turn produces a printed output.

The image forming apparatus 100 includes an image forming unit 103, an image processing unit 104, a density control unit 105, and a writing control unit 107.

Figure 2:
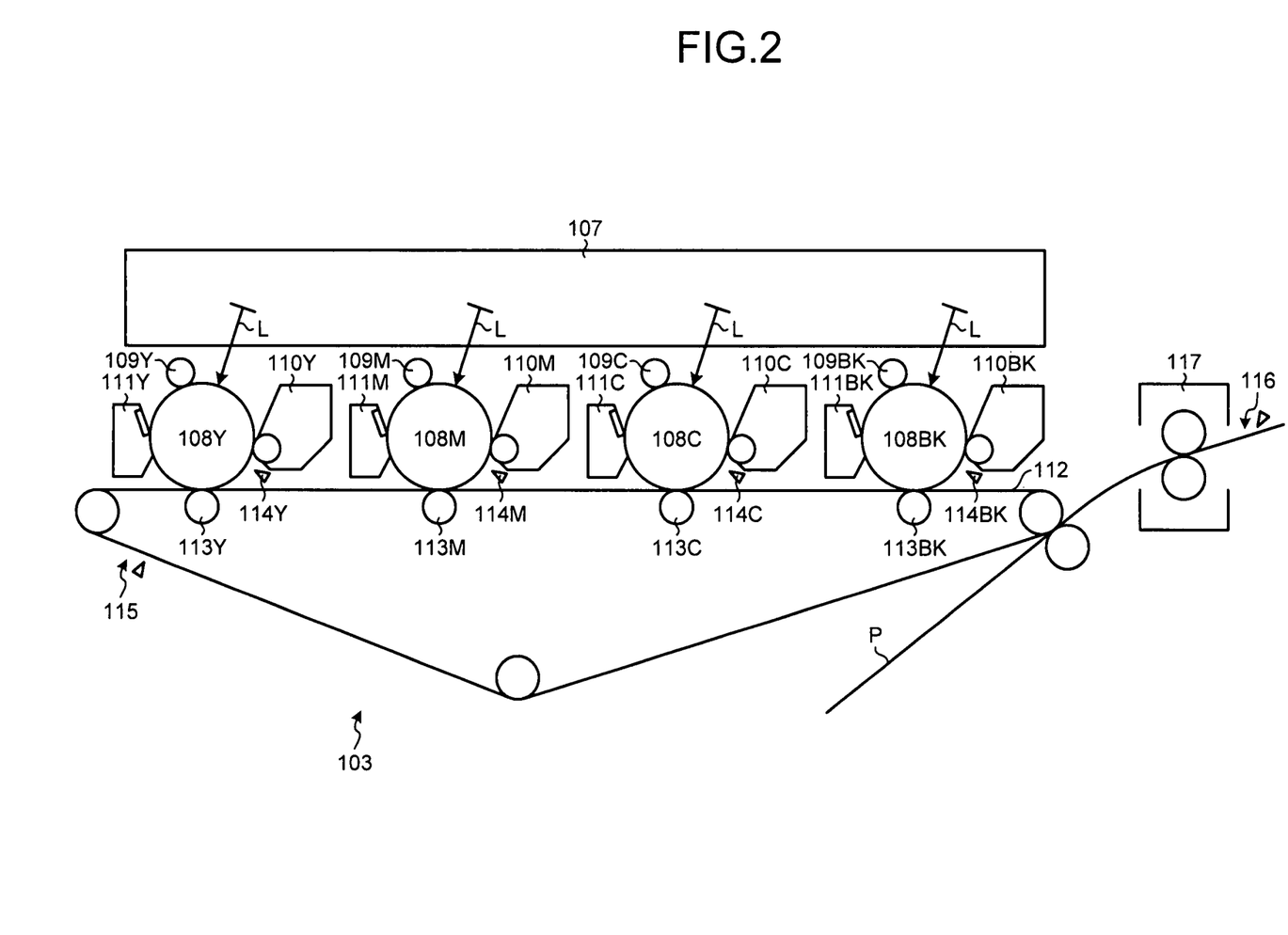
FIG. 2 is a block diagram illustrating relevant portions of an image forming unit illustrated in FIG. 1.

FIG. 2 is a block diagram illustrating relevant portions of the image forming unit 103 illustrated in FIG. 1. The image forming apparatus 100 is a typical electrophotographic color image forming apparatus that forms a color image by using toner images of yellow (Y), magenta (M), cyan (C), and black (Bk).

As illustrated in FIG. 2, image forming units corresponding to the colors (yellow, magenta, cyan, and black) are arranged so as to face an intermediate transfer belt 112. The four image forming units mounted on the image forming apparatus 100 are nearly identical to one another in configuration except for a color of the toner used in an image forming process. Accordingly, although each of photosensitive drums 108, and primary-transfer bias rollers 113 included in the image forming unit 103 is indicated by a reference numeral, to which a reference symbol (Y, M, C, or Bk) is appended in FIG. 2, configurations and processes of the image forming units will be described below with an example of one of the image forming units of one color.

Referring to FIG. 2, the image forming unit includes the photosensitive drum 108 (108C, 108M, 108Y, or 108BK) serving as an image carrier, and a charging unit 109 (109C, 109M, 109Y, or 109BK), a developing unit 110 (110C, 110M, 110Y, or 110BK), a cleaning unit 111 (111C, 111M, 111Y, or 111BK), and a like that are arranged around the photosensitive drum 108. By performing the image forming processes (a charging process, an exposure process, a developing process, a transferring process, and a cleaning process) on the photosensitive drum 108, a desired toner image is formed on the photosensitive drum 108.

Referring to FIG. 2, the photosensitive drum 108 is rotated clockwise in FIG. 2 by a driving unit (not shown). A surface of the photosensitive drum 108 is uniformly charged by the charging unit 109 (the charging process). In this example, a roller is used as the charging unit 109 which is in contact with the photosensitive drum 108 for charging; however, an element, such as an electrification charger, that is to be arranged in a noncontact position to the photosensitive drum 108 can alternatively be used.

Thereafter, the surface of the photosensitive drum 108 reaches a position to be irradiated by laser light L emitted from the laser device that is controlled by the writing control unit 107. At this position, the surface undergoes exposure scanning, which forms an electrostatic latent image on the surface (the exposure process).

Subsequently, the surface of the photosensitive drum 108 reaches a position to face a developing roller of the developing unit 110. At this position, development of the electrostatic latent image is performed, by which a desired toner image is formed (the developing process).

Thereafter, the surface of the photosensitive drum 108 reaches a position where the intermediate transfer belt 112 and the primary-transfer bias roller 113 (113C, 113M, 113Y, or 113BK) face each other. At this position, the toner image on the photosensitive drum 108 is transferred onto the intermediate transfer belt 112 (112C, 112M, 112Y, or 112BK) (a primary transferring process). Although a little amount, the toner that is not transferred onto the intermediate transfer belt 112 remains on the surface of the photosensitive drum 108. Then, the surface of the photosensitive drum 108 reaches a position to face the cleaning unit 111. At this position, the toner that remains on the photosensitive drum 108 is collected by a cleaning blade included in the cleaning unit 111 (the cleaning process).

The color toner image formed on the intermediate transfer belt 112 is transferred onto a recording sheet P having been conveyed to a secondary transfer nip position. A series of the transfer processes performed on the intermediate transfer belt 112 ends accordingly. Meanwhile, the recording sheet P has been conveyed to the secondary transfer nip position from a feeding unit arranged at a lower portion of a body of the image forming apparatus 100 via feed rollers, registration rollers, and the like. A desired color image is transferred onto the recording sheet P in this way.

Thereafter, the recording sheet P, onto which the color image has been transferred at the secondary transfer nip position, is conveyed to a position of a fixing device 117, where the recording sheet P receives heat from a fixing roller and pressure from a pressure roller to fix the color image that has been transferred onto the surface of the recording sheet P on the recording sheet P. Thereafter, the recording sheet P passes through a nip between a pair of discharging rollers to thus be discharged to an outside of the image forming apparatus 100.

In FIG. 2, reference numerals and associated symbols 114Y, 114M, 114C, and 114K denote first sticking-toner-amount detection sensors, each of which detects an amount of toner formed on and sticking to a corresponding one of the photosensitive drums 108; 115 denotes a second sticking-toner-amount detection sensor that detects an amount of toner transferred to and formed on the intermediate transfer belt 112; 116 denotes a density detection sensor that detects image density on the transferred material P.

Figure 3:
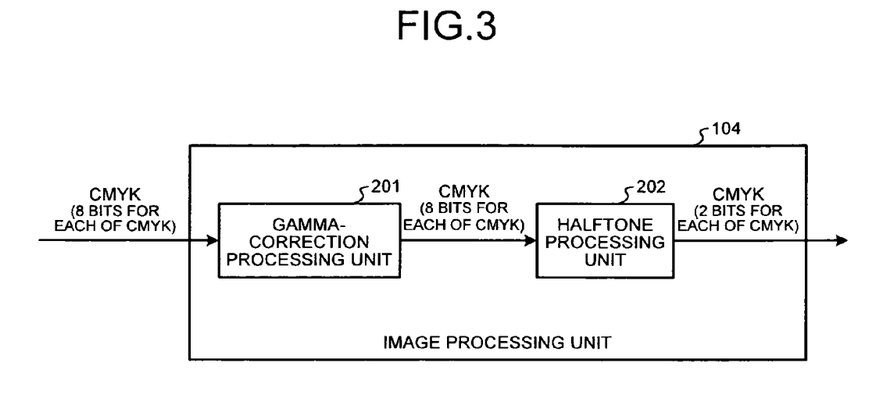
FIG. 3 is a block diagram illustrating the configuration of an image processing unit illustrated in FIG. 1.

FIG. 3 is a block diagram illustrating the configuration of the image processing unit 104 illustrated in FIG. 1. The image processing unit 104 includes a gamma-correction processing unit 201 that performs correction on image data input from the print server (DFE) 120 according to a correction table and a halftone processing unit 202 that performs halftone processing.

The charging unit 109 has a function of passing a desired amount of electric charge to the surface of the photosensitive drum 108 and is capable of changing the amount of the charge by controlling a charge-potential control signal. The developing unit 110 has a function of developing toner onto the photosensitive drum 108 and is capable of changing a developing bias Vb by using a developing-bias control signal. The laser device controlled by the writing control unit 107 has a function of forming a latent image on the photosensitive drum 108 according to image signals and is capable of changing an amount of exposing light at laser emission by using a laser-diode (LD) power control signal.

The image scanning apparatus 140 connected to the image inspection apparatus 130 scans the print-output recording sheet to obtain image information. Meanwhile, the RIP image data has been transferred also to the image inspection apparatus 130 as a right image (original image data). The image inspection apparatus 130 compares the RIP image data with data obtained by performing color conversion on the scanned image data obtained by the image scanning apparatus 140, thereby performing image inspection.

Figure 4:
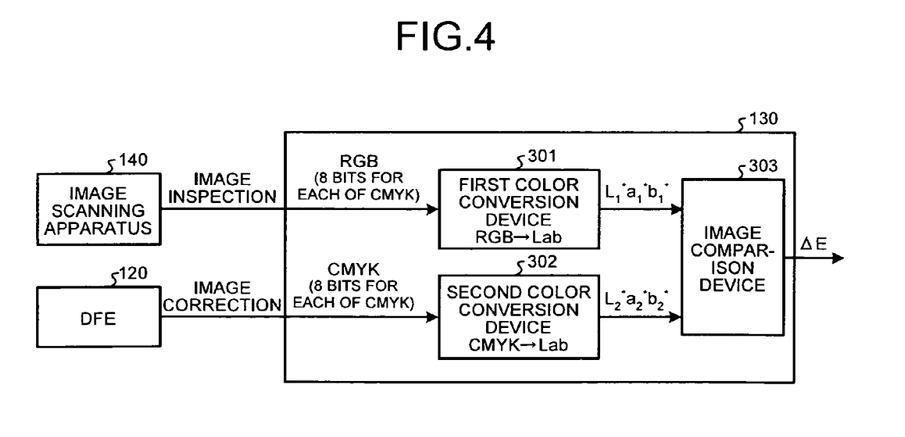
FIG. 4 is a block diagram illustrating the configuration of an image inspection apparatus illustrated in FIG. 1.

FIG. 4 is a block diagram illustrating the configuration of the image inspection apparatus 130 illustrated in FIG. 1. The image data obtained by scanning by the image scanning apparatus 140 is output as RGB format data and then converted by a first color conversion device 301 into L*a*b* values (which are referred to as scanned image data). Concurrently, a second color conversion device 302 converts the correct image data (8 bits for each of C, M, Y, and K) having been input from the print server (DFE) 120 into L*a*b* values (which are referred to as the original image data). An image comparison device 303 compares the two data pieces, or original image data and the scanned image data, to determine a color difference ΔE of the printed output image. Here, ΔE is given by $$\Delta E = ((L^*_1 - L^*_2)^2 + (a^*_1 - a^*_2)^2 + (b^*_1 - b^*_2)^2)^{1/2}.$$

Next, density correction processes to be performed by the density control unit 105 of the image forming apparatus 100 will be described below. As illustrated in FIG. 2, which has already been referred to, the image forming apparatus 100 includes the first sticking-toner-amount detection sensors 114, each of which detects a sticking toner amount of an image formed on the corresponding photosensitive drum 108, the second sticking-toner-amount detection sensor 115 that detects a sticking toner amount of an image transferred onto the intermediate transfer belt 112, and the density detection sensor 116 that detects a density of an image transferred onto a recording sheet. The density control unit 105 corrects image density based on results of the detection by these sensors.

A first density correction process to be performed by the density control unit 105 is a process of adjusting the correction table for gamma correction by using a correction patch formed during a process of image formation.

A density correction toner image (a not-yet-fixed patch image) is formed on the photosensitive drum 108 at any one of an inter-sheet position where a user image (an image, printing of which has been directed by the user via the client PC 101) is not formed and a position outside an image forming area (end portions in a main scanning direction) where user images are to be formed. The first sticking-toner-amount detection sensor 114 detects a sticking toner amount of the toner image. The correction table for the gamma-correction processing unit 201 in the image processing unit 104 is adjusted based on a result of the detection.

Figure 5:
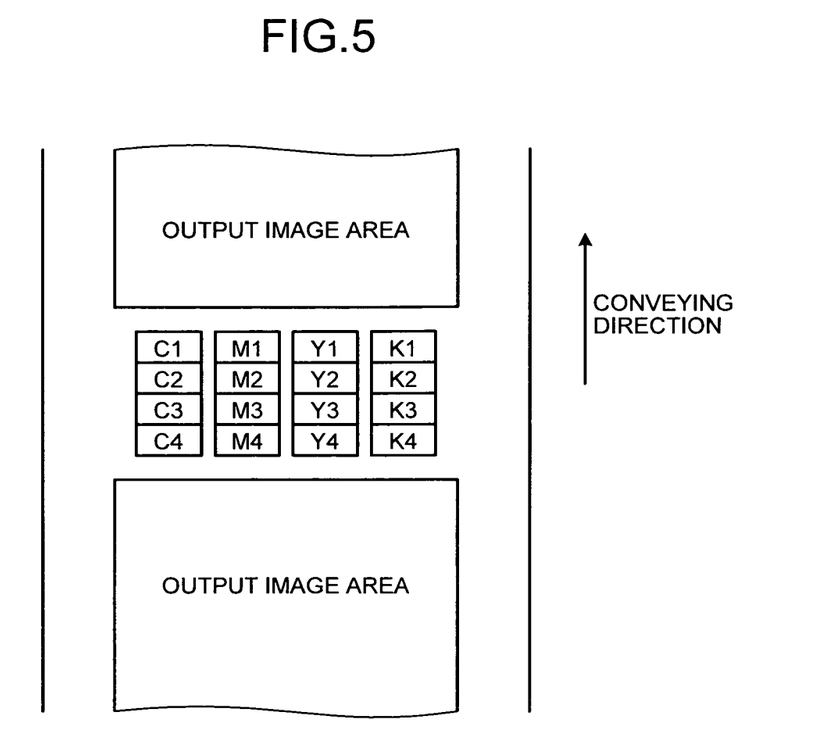
FIG. 5 is an explanatory diagram illustrating density correction patches (16 patches made of 4 patches×4 rows) formed outside an image forming area.

FIG. 5 is an explanatory diagram illustrating density correction patches (16 patches made of 4 patches×4 rows) formed outside the image forming area at an inter-sheet position. Meanwhile, control can alternatively be performed based on a sticking toner amount measured by the second sticking-toner-amount detection sensor 115 on the intermediate transfer belt 112.

A second density correction process to be performed by the density control unit 105 is a process of adjusting the correction table for gamma correction by using a correction patch printed on a recording sheet.

A density correction patch image is output onto a recording sheet between outputs of user images. The density detection sensor 116 provided above the sheet surface obtains density of the patch image. The correction table for the gamma-correction processing unit 201 in the image processing unit 104 is adjusted based on the density obtained by the density detection sensor 116.

Figure 6:
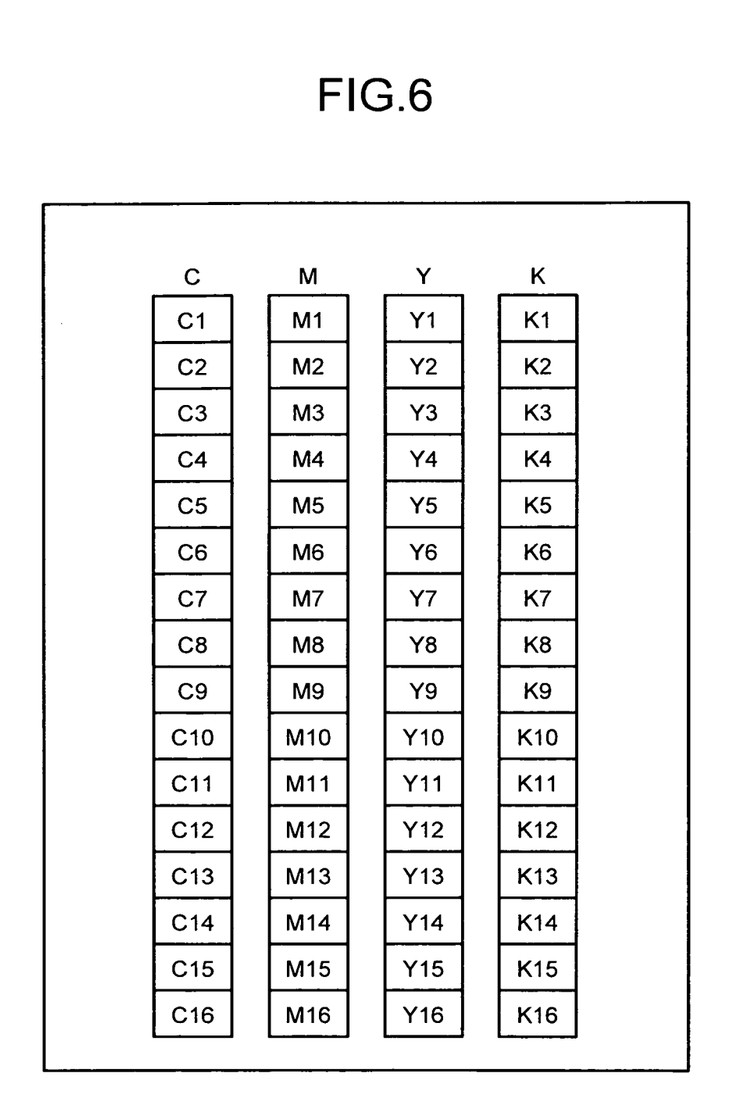
FIG. 6 is an explanatory diagram illustrating explanatory density correction patches (64 patches made of 16 patches×4 rows) printed on a recording sheet.

FIG. 6 is an explanatory diagram illustrating density correction patches (64 patches made of 16 patches×4 rows) printed on a recording sheet.

A configuration in which, in lieu of the density detection sensor 116 provided above the surface of a recording sheet to detect an image density, the image scanning apparatus 140 obtains the density of the patch image, or a configuration in which an image scanning apparatus (scanner) mounted on the image forming apparatus 100 obtains the density of the patch image may alternatively be employed.

In the first embodiment, operations of the density control unit 105 are controlled based on a color difference (a magnitude of a density change) of the output image (user image) detected by the image inspection apparatus 130. The color difference detected by the image inspection apparatus 130 is transmitted to the density control unit 105 included in the image forming apparatus 100.

Figure 7:
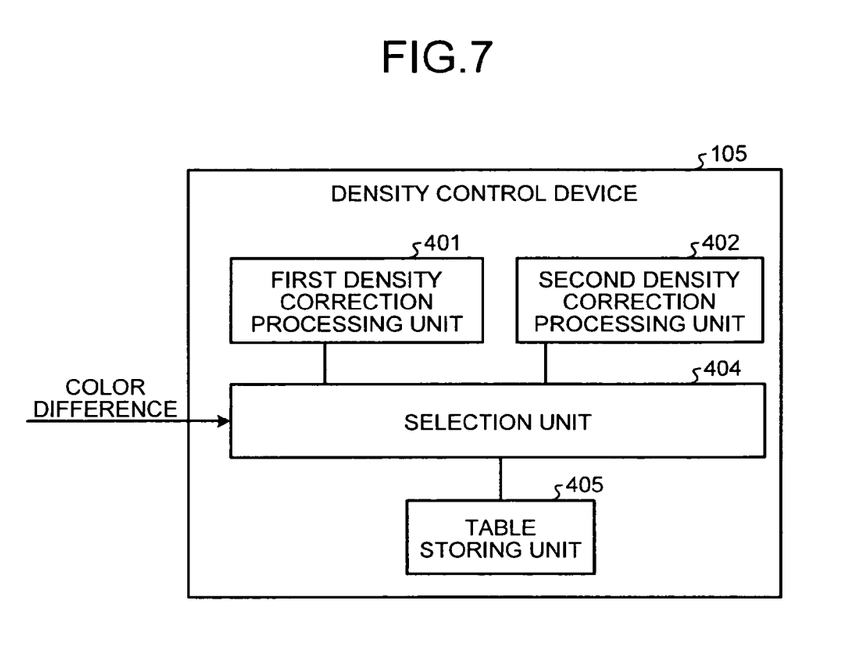
FIG. 7 is a block diagram illustrating the configuration of a density control unit according to the first embodiment.

FIG. 7 is a block diagram illustrating the configuration of the density control unit 105 according to the first embodiment. In FIG. 7, reference numerals 401 and 402 denote a first density correction processing unit and a second density correction processing unit which, respectively, perform the above-described first and second density correction processes; 404 denotes a selecting unit that selects either the first density correction processing unit 401 or the second density correction processing unit 402 according to a color difference and by consulting a table storing unit 405; 405 denotes the table storing unit that stores the table illustrated in FIG. 8 or FIG. 11.

Figure 8:
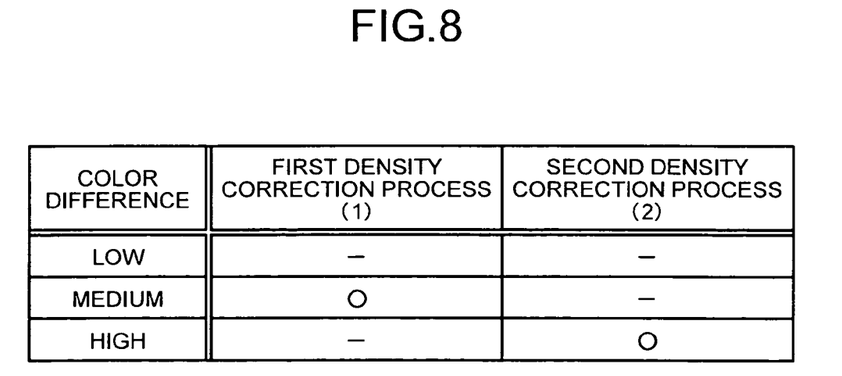
FIG. 8 is a table illustrating contents stored in a table storing unit according to the first embodiment.

In the first embodiment, the density control unit 105 includes the first density correction processing unit 401 and the second density correction processing unit 402; the table storing unit 405 stores the table illustrated in FIG. 8.

As illustrated in FIG. 8, the selection unit 404 of the density control unit 105 selects any one of the first density correction processing unit 401 and the second density correction processing unit 402 according to a magnitude of a color difference to control operations (a process to be performed is indicated by an open circle).

In FIG. 8, a color difference is classified into one of low, medium and high as follows:

if $\Delta E \leq 3$, the color difference is "low";
if $3 < \Delta E \leq 8$, the color difference is "medium";
if $8 < \Delta E$, the color difference is "high".

Figure 9:
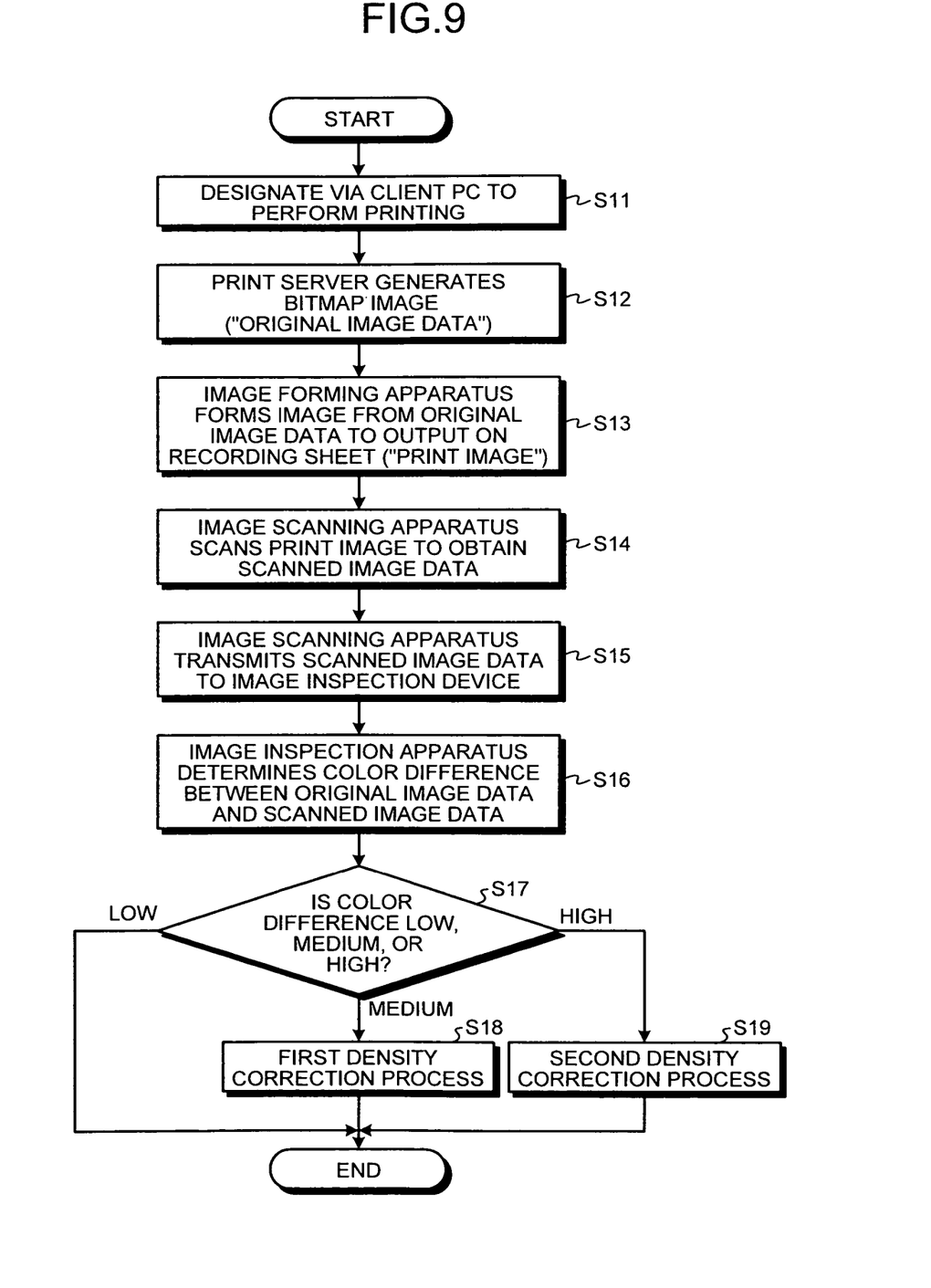
FIG. 9 is a flowchart illustrating exemplary control operations according to the first embodiment.

FIG. 9 is a flowchart illustrating exemplary control operations according to the first embodiment. In FIG. 9, when a user designates via the client PC 101 to perform printing (step S11), as already described above, the print server (DFE) 120 parses printer language and performs image rendering to generate a bitmap image with output bits amounting to a file size that is receivable by the image forming apparatus 100 connected to the client PC 101 (step S12). The image forming apparatus 100 outputs an image according to the bitmap image onto a recording sheet (step S13). This image output onto the recording sheet is referred to as a print image. Subsequently, the image scanning apparatus 140 scans the print image to obtain scanned image data (step S14). The image scanning apparatus 140 then transmits the scanned image data to the image inspection apparatus 130 (step S15). The image inspection apparatus 130 determines a color difference between converged image data, which are obtained by subjecting the scanned image data obtained by scanning by the image scanning apparatus 140 to color conversion performed by the first color conversion device 301, and converged image data, which is obtained by subjecting the image data input from the print server (DFE) 120 to color conversion performed by the second color conversion device 302 (step S16). A determination is made as to which one of low, medium, and high having been set as described above the thus-obtained color difference is classified into (step S17).

If it is determined at step S17 that the color difference is low, no density correction process is performed because there is no need to perform density correction. Generally, when the color difference is close to three, density change is substantially indistinguishable.

If it is determined at step S17 that the color difference is medium, the selecting unit 404 selects the first density correction processing unit 401, causing the first density correction process to be performed to prevent drop in productivity (step S18). In the first embodiment, the color difference ΔE is set to be equal to or smaller than 8; this value is desirably set to a value close to ability of the first density correction processing unit 401 to perform correction. That is, when the color difference falls in a range in which the first density correction processing unit 401 can correct the color difference, correction is performed without decreasing productivity.

When it is determined at step S17 that the color difference is high, the selecting unit 404 selects the second density correction processing unit 402, causing the second density correction process to be performed (step S19). This is because there is possibility that the first density correction processing unit 401 is incapable of correcting the color difference adequately. Only in such a case, an output of a user image is stopped and high-accuracy correction is performed.

Thus, according to the first embodiment, a density correction process is controlled based on a magnitude of a density change that has actually occurred in a print image. Therefore, suppressing a density change that occurs in an output image can be achieved while minimizing a decrease in productivity. Furthermore, an amount of toner consumed in forming a density correction patch can also be minimized because, in a case that the density change is low, no density control process is performed.

When the second density correction process is to be performed, a notification that the second density correction process is to be performed can be made to a user of the image forming apparatus 100 via a control panel or an alarm lamp of the image forming apparatus 100. This is effective for a case in which a sheet, on which a density correction patch image is printed, and a sheet, on which a user image is printed, are discharged to a same discharging port or a case in which a density of the density correction patch image is to be scanned by a scanner on the image forming apparatus 100.

Second Embodiment

In a second embodiment of the present invention, each of the first and second density correction processes adjusts the correction table to be used in the gamma correction. When a change in an image forming setting has been made such that image density in forming a highest density portion of an image is increased in the setting of the image forming apparatus 100, image density is adjustable by performing correction by using the correction table so as to lighten the highest density. In contrast, when a change in an image forming setting has been made such that image density in forming a highest density portion of an image is decreased in the setting of the image forming apparatus 100, image density is unadjustable by adjusting the correction table. Therefore, there is a need for a density correction process for adjusting the highest density appropriately. Actually, there is a well-known technique used in a density correction process for a process adjustment as described below.

FIG. 8 is a block diagram illustrating the configuration of the density control unit 105 according to the second embodiment. The configuration of the second embodiment differs from the configuration illustrated in FIG. 7 of the first embodiment in additionally including a third density correction processing unit 403. Note that the table storing unit 405 stores the table illustrated in FIG. 11. The configuration of the second embodiment is similar to that illustrated in FIG. 7 except for the third density correction processing unit 403 and the table storing unit 405; accordingly, elements are denoted by same reference numerals and symbols as those of FIG. 7 and repeated descriptions are omitted.

A third density correction process to be performed by the third density correction processing unit 403 of the density control unit 105 is a process adjustment. As in the first density correction process, a density correction toner image (a not-yet-fixed patch image) is formed on the photosensitive drum 108; each of the first sticking-toner-amount detection sensors 114 on the photosensitive drum 108 and the second sticking-toner-amount detection sensor 115 on the intermediate transfer belt 112 detects a sticking toner amount of the toner image. The third density correction processing unit 403 adjusts process conditions (the LD power control signal, the developing-bias control signal, and the charge-potential control signal described above) based on results of the detection.

This third density correction process performed by the third density correction processing unit 403 adjusts the process conditions, and therefore requires an output of a user image to be temporarily stopped, thereby decreasing productivity (generally, stop time required by the third density correction process is shorter than that required by the second density correction process). However, the third density correction process is capable of performing adjustment for a case in which the highest density is output in a lighter density, which is unadjustable by any one of the first and second density correction processes.

Figure 10:
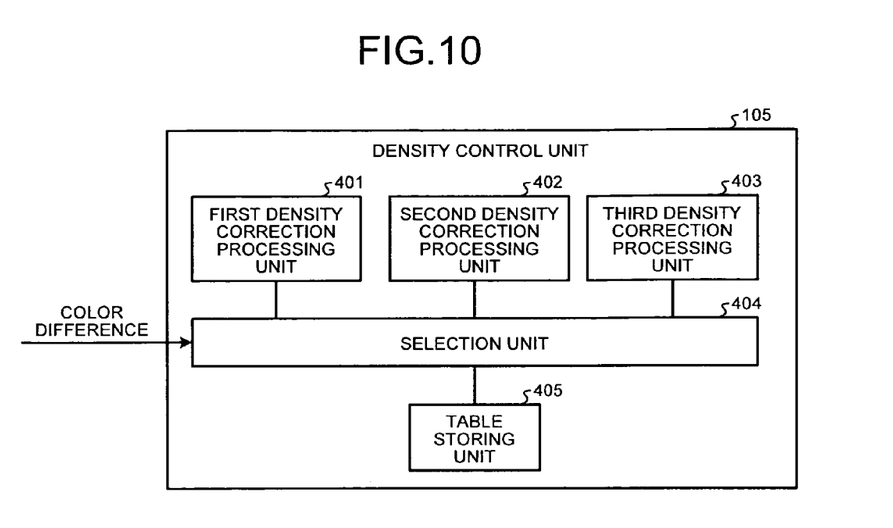
FIG. 10 is a block diagram illustrating the configuration of a density control unit according to a second embodiment of the present invention.

As illustrated in FIG. 10, the selection unit 404 of the density control unit 105 selects any one of the first to third density correction processing units 401 to 403 according to a color difference of an output image (a user image) detected by the image inspection apparatus 130 to control operations.

Figure 12:
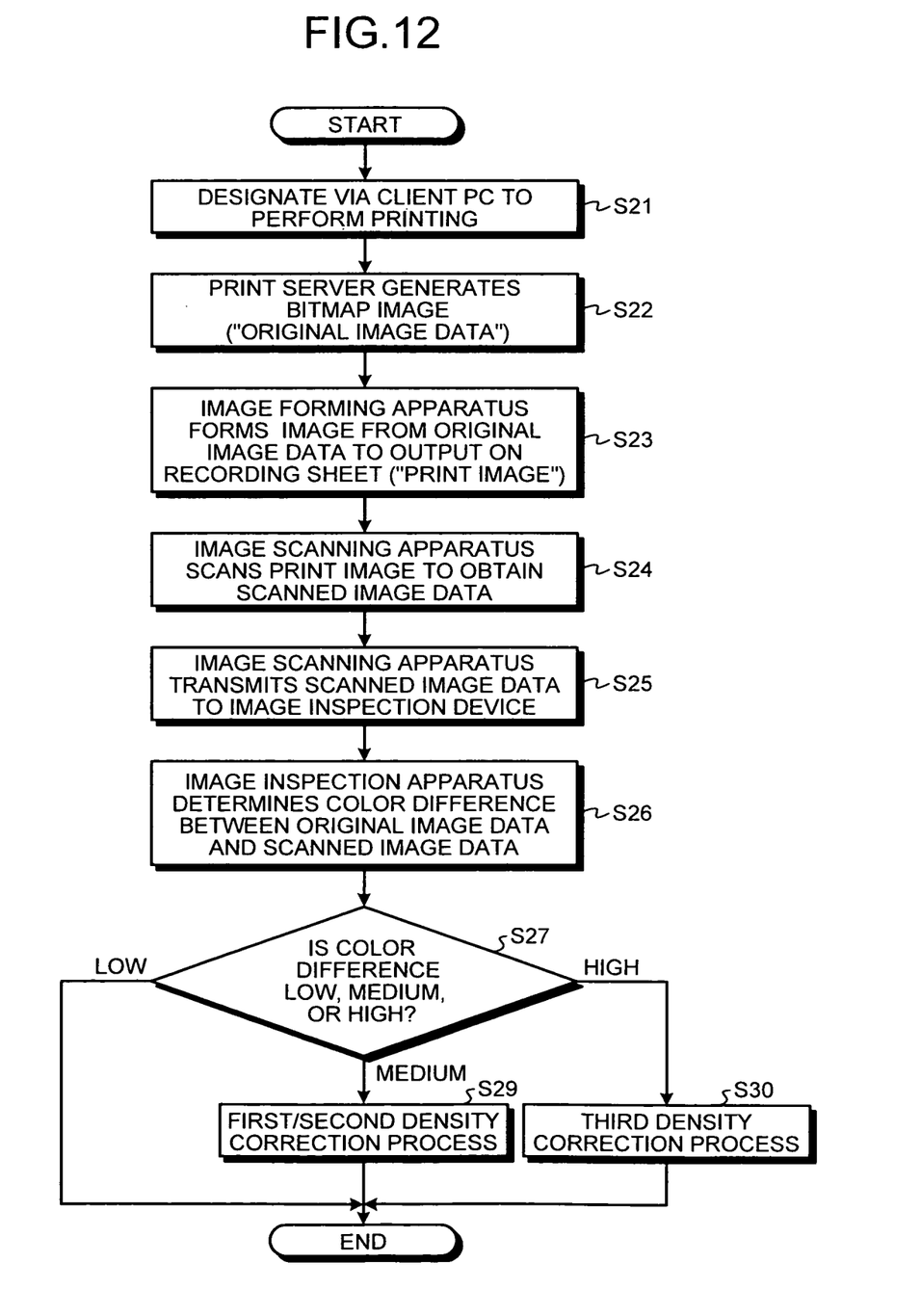
FIG. 12 is a flowchart illustrating exemplary control operations according to the second embodiment.

FIG. 12 is a flowchart illustrating exemplary control operations according to the second embodiment. Steps S21 to S26 of FIG. 12 are similar to steps S11 to S16 of FIG. 9 described above. Note that, at step S26, a color difference of a high density region and that of a low-to-medium density region are detected individually (low density region: 0 to 85; medium density region: 86 to 170; high density region: 171 to 255). Calculation and classification of a color difference into low, medium, or high are performed as in the first embodiment. Note that when a color difference of a high-density region is determined to be "medium", it is determined whether a density is changed to a higher density or a lower density as compared to a density that is to be reproduced in a correct process. A density is determined to have changed to a lower value when a change in brightness, $((L^*_1)-(L^*_2))$, is found to have a positive value whereas a density is determined to have changed to a higher value when the change in brightness is found to have a negative value.

Next, the color difference obtained at step S26 is determined to be classified into one of low, medium, and high density categories as described above (step S27).

When it is determined at step S27 that the color difference in the high density portion is small, it is unnecessary to perform the third density correction process by the third density correction processing unit 403 because there is no need for an adjustment of the highest density. The first and second density correction processing units 401 and 402 are controlled according to a magnitude of a color difference in the low-to-medium density portions in a similar manner as in the first embodiment (step S28).

When it is determined at step S27 that the color difference in the high density portion is medium and a change to a higher density has occurred, the highest density can be adjusted appropriately by one of the first and second density correction processing units 401 and 402; therefore, the third density correction process by the third density correction processing unit 403 is not performed. If the color difference in the low-to-medium density falls in a range (low or medium) where the first density correction processing unit 401 is capable of correcting the color difference, correction is performed by the first density correction processing unit 401 without decreasing productivity. If the color difference in the low-to-medium density exceeds the range, the high-accuracy correction is performed by the second density correction processing unit 402 by interrupting an output of a user image (step S29).

When it is determined at step S27 that the color difference in the high density is medium and a change to a lower density has occurred, or that the color difference in the high density is high, the third density correction processing unit 403 performs the third density correction process to the highest density as a process control (step S30). Meanwhile, when the color difference in the low-to-medium density is low, only an adjustment of the high density is required, and accordingly, only the third density correction process by the third density correction processing unit 403 is performed. On the contrary, when the color difference in the low-to-medium density is medium or high, any one of the first density correction process by the first density correction processing unit 401 and the second density correction process by the second density correction processing unit 402 is also performed.

Figure 11:
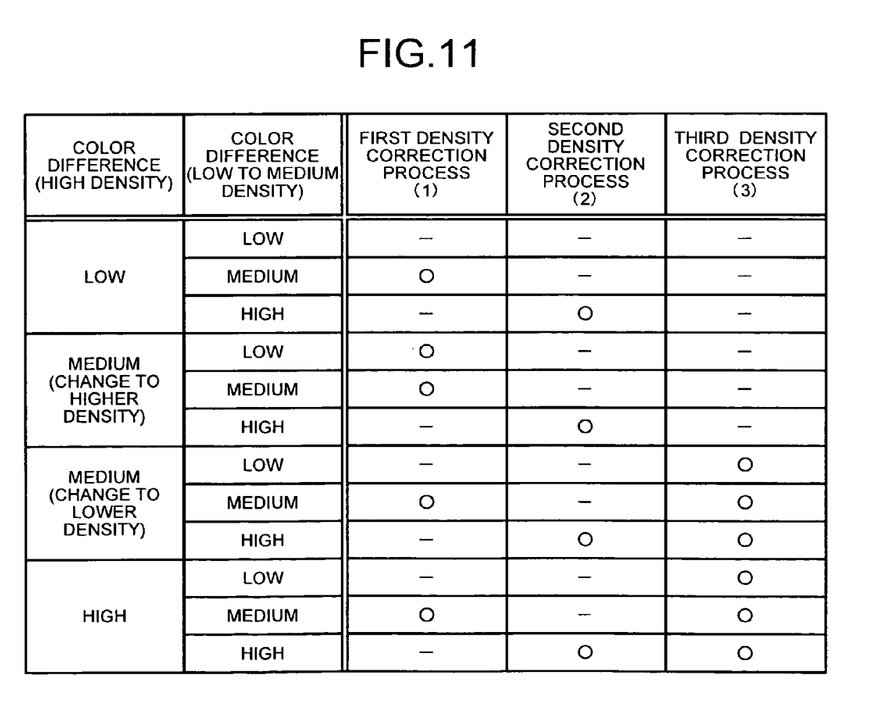
FIG. 11 is a table illustrating contents stored in a table storing unit according to the second embodiment.

When both the second density correction processing unit 402 and the third density correction processing unit 403 are to be performed, a period of time to interrupt an output of a user image becomes longer, corresponding to two cases among twelve cases listed in FIG. 11 to be limited to minimum cases.

With the configuration described above, density correction processes are controlled based on a magnitude of a density change of each density region that has actually occurred in a print image, so that suppression of a density change can be achieved while minimizing a decrease in productivity.

Figure 13:
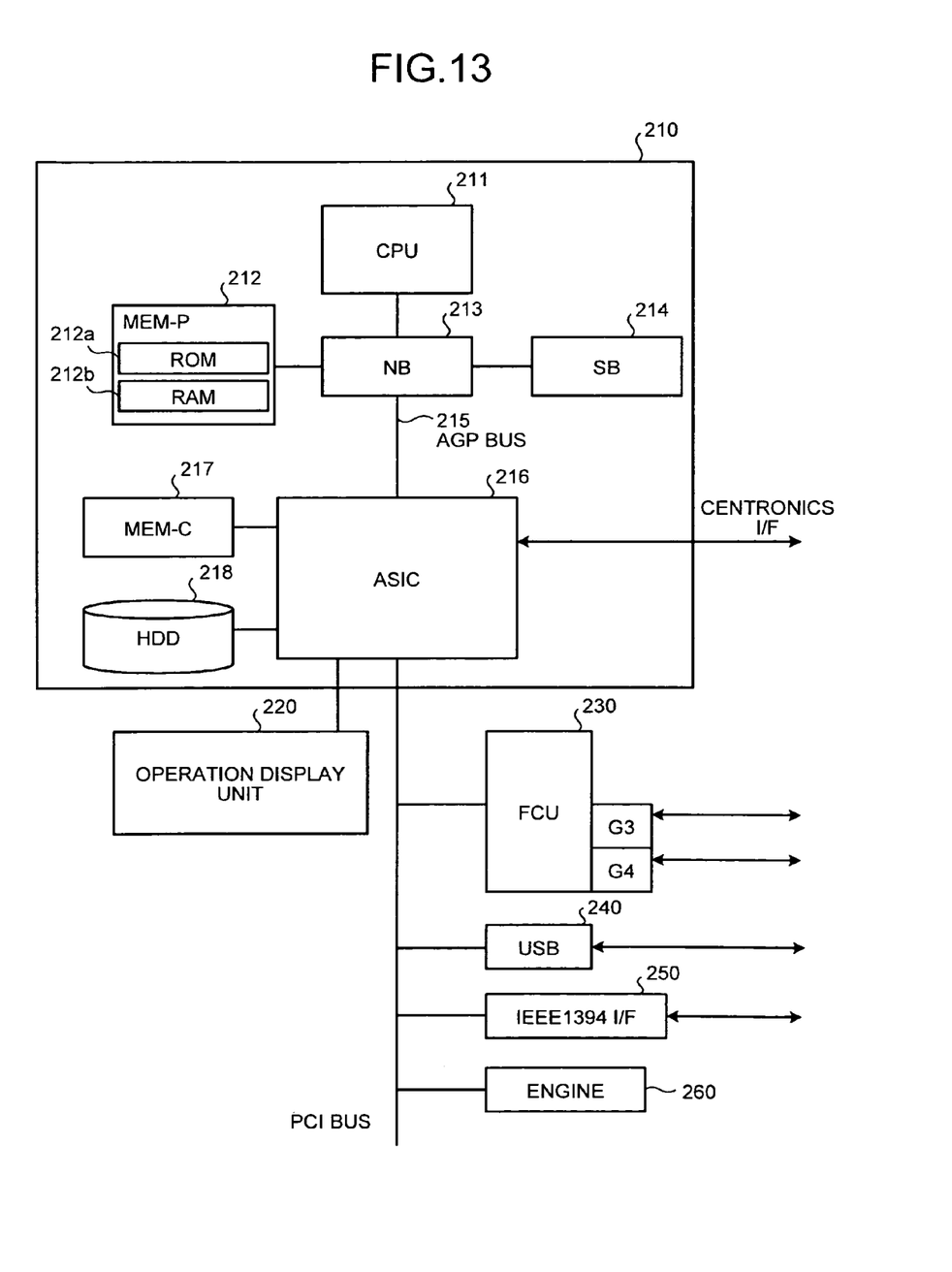
FIG. 13 is a block diagram illustrating an exemplary hardware configuration of the image forming apparatus.

FIG. 13 is a block diagram illustrating an exemplary hardware configuration of the image forming apparatus. As illustrated in FIG. 13, the image forming apparatus (MFP) includes a controller 210 and an engine unit 260 connected to each other via a peripheral component interface (PCI) bus. The controller 210 is a controller that controls a whole of the image forming apparatus, rendering, communications, and inputs from an operating unit (not shown). The engine unit 260 is a printer engine or the like that is connectable to the PCI bus. The engine unit 260 includes a printer engine that is connectable to the PCI bus and may be realized by a monochrome plotter, a one-drum color plotter, a four-drum color plotter, a scanner, a facsimile unit and the like. The engine unit 260 includes, in addition to so-called an engine section that includes a plotter, an image processing section that performs error diffusion, gamma conversion, and the like.

The controller 210 includes a central processing unit (CPU) 211, a north bridge (NB) 213, a system memory (MEM-P) 212, a south bridge (SB) 214, a local memory (MEM-C) 217, an application-specific integrated circuit (ASIC) 216, and a hard disk drive (HDD) 218, and an accelerated graphics port (AGP) bus 215 which connects the NB 213 with the ASIC 216. The MEM-P 212 further includes a read only memory (ROM) 212a and a random access memory (RAM) 212b.

The CPU 211 controls the whole of the image forming apparatus and includes a chip set that includes the NB 213, the MEM-P 212, and the SB 214. The CPU 211 is connected to other devices via the chip set.

The NB 213 is a bridge for connecting the CPU 211 with the MEM-P 212, the SB 214, and the AGP bus 215. The NB 213 includes a memory controller that controls reading and writing from and to the MEM-P 212 and the like, a PCI master, and an AGP target.

The MEM-P 212 is the system memory that includes the ROM 212a and the RAM 212b and is to be used as a memory to store computer programs and data, to load computer programs and data, and to render an image as an input to a printer. The ROM 212a is the read only memory for use as a memory for storing computer programs and data. The RAM 212b is a writable and readable memory for use in loading computer programs and data from one of the HDD 218 and the ROM 212a, a memory for use in rendering images which are to be printed by the printer, and the like.

The SB 214 is a bridge for connecting the NB 213 to a PCI device and peripheral devices. The SB 214 is connected to the NB 213 via the PCI bus, to which a network interface (I/F) unit and the like are also connected.

The ASIC 216, which is an integrated circuit (IC) for use in image processing, includes a hardware component for image processing and functions as a bridge that connects the AGP bus 215, the PCI bus, Centronics I/F, the HDD 218, and the MEM-C 217 with one another. The ASIC 216 includes a PCI target and an AGP master, an arbiter (ARB) serving as the core for the ASIC 216, a memory controller that controls the MEM-C 217, a plurality of direct memory access controllers (DMACs) that performs rotation of image data and the like by hardware logic or the like, and a PCI unit that performs data transfer to and from the engine unit 260 via the PCI bus. A facsimile control unit (FCU) 230, a universal serial bus (USB) 240, and an IEEE 1394 (the Institute of Electrical and Electronics Engineers 1394) I/F 250 are connected to the ASIC 216 via the PCI bus. An operation display unit 220 is directly connected to the ASIC 216.

The MEM-C 217 is the local memory for use as a copy image buffer and a code buffer. The HDD 218 is storage for storing image data, computer programs, font data, and forms.

The AGP bus 215 is a bus interface for a graphics accelerator card introduced to speed up graphics operations and allows direct access to the MEM-P 212 with a high throughput, thereby speeding up operations related to the graphic accelerator card.

The computer programs to be executed by the image forming apparatus according to the embodiment may be provided in a computer-readable recording medium such as a compact disc-read-only memory (CD-ROM), a flexible disk (FD), a CD recordable (CD-R), or a digital versatile disk (DVD) in an installable or executable format. The computer programs to be executed by the image forming apparatus according to the embodiment may be configured so as to be stored in a computer connected to a network, such as the Internet, so that the computer programs are provided by downloading over the network. The computer programs to be executed by the image forming apparatus according to the embodiment may be configured so as to be provided or distributed over a network, such as the Internet.

The computer programs to be executed by the image forming apparatus according to the embodiment may be configured to be provided as being stored in ROM or the like in advance. The computer programs to be executed by the image forming apparatus according to the embodiment have a module structure that includes the units of the image forming apparatus described above. In terms of actual hardware, the CPU (processor) reads image forming computer programs from the storage medium and executes the computer programs to load the units on a main memory device, thereby generating the units on the main memory device.

According to an aspect of the present invention, density correction processes are controlled based on a magnitude of a density change that has actually occurred in a print image, so that a density change can be reduced without decreasing productivity.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a first density correction unit that corrects density correction characteristics in correcting density of print image data to be output by using a density correction patch formed in an image forming process;
   a second density correction unit that corrects the density correction characteristics by using a density correction patch printed on a recording sheet;
   an image inspection unit that compares an image density of inspection image data obtained by scanning a printed output image with an image density of the print image data to be output, thereby inspecting a magnitude of a density change in the printed output image; and
   a density control unit that selects any one of the first density correction unit and the second density correction unit according to the magnitude of the density change inspected by the image inspection unit and causes the density correction characteristics to be corrected by the selected one of the first density correction unit and the second density correction unit.

2. The image forming apparatus according to claim 1, wherein when the magnitude of the density change is smaller than a predetermined value, the density control unit corrects the image density by using the first density correction unit, whereas when the magnitude of the density change is equal to or larger than the predetermined value, the density control unit corrects the image density by using the second density correction unit.

3. The image forming apparatus according to claim 2, wherein the predetermined value for the magnitude of the density change is nearly a same magnitude to an accuracy for correction that the first density correction unit can perform.

4. The image forming apparatus according to claim 2, further comprising a notification unit that notifies a user that the density correction is performed by using the second density correction unit.

5. An image forming apparatus comprising:
   a first density correction unit that corrects density correction characteristics in correcting density of print image data to be output by using a density correction patch formed in an image forming process;
   a second density correction unit that corrects the density correction characteristics by using a density correction patch printed on a recording sheet;
   a third density correction unit that adjusts a condition of an image forming process by using a density correction patch formed in an image forming process;
   an image inspection unit that compares an image density of inspection image data obtained by scanning a printed output image with an image density of the print image data to be output, thereby inspecting magnitudes of density changes occurred in two tonal regions which are a high-density region and a low-to-medium-density region, and which direction a density change has taken between to a lower density and to a higher density in the high-density region; and
   a density control unit that controls the first density correction unit, the second density correction unit, and the third density correction unit according to results of the inspection on the magnitudes of density changes and direction of the density change inspected by the image inspection unit.

6. The image forming apparatus according to claim 5, wherein when a density change to a higher density has occurred in the high-density region, the density control unit corrects image density in the high-density region by using any one of the first density correction unit and the second density correction unit, whereas when the density change that has occurred in the high-density region is to a lower density, the density control unit corrects the image density by using the third density correction unit.

7. The image forming apparatus according to claim 5, wherein if the magnitude of the density change occurred in the high-density region is equal to or greater than a predetermined value, the density control unit corrects image density in the high-density region by using the third density correction unit irrespective of which one of a change to a lower density and a change to a higher density has occurred in the high-density region.

8. The image forming apparatus according to claim 6, further comprising a notification unit that notifies a user that the density correction is performed by using the second density correction unit.

9. An image forming method comprising:
- correcting, as first density correction, density correction characteristics in correcting density of print image data to be output by using a density correction patch formed in an image forming process;
- correcting, as second density correction, the density correction characteristics by using a density correction patch printed on a recording sheet;
- performing image inspection by inspecting a magnitude of a density change occurred in a printed output image by comparing an image density of inspection image data obtained by scanning the printed output image with an image density of the print image data to be output; and
- causing the density correction characteristics to be corrected by a selected one of the first density correction and the second density correction, the selected one being determined according to the magnitude of the density change inspected at the image inspection.

* * * * *